Patented Nov. 19, 1929

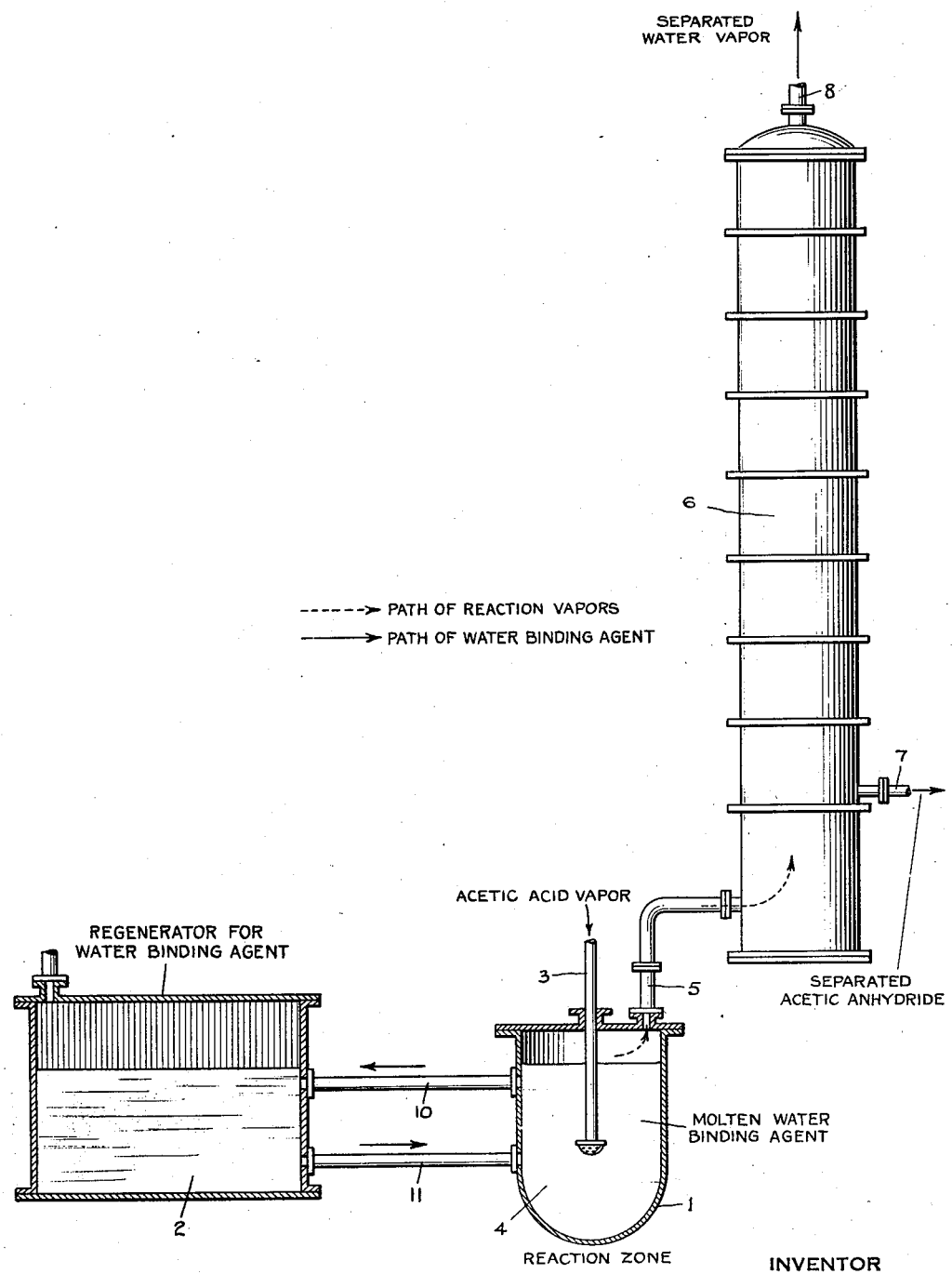

1,735,956

UNITED STATES PATENT OFFICE

HENRY DREYFUS, OF LONDON, ENGLAND

MANUFACTURE OF ACETIC ANHYDRIDE

Application filed April 3, 1926, Serial No. 99,660, and in Great Britain April 9, 1925.

This invention relates to the manufacture of acetic anhydride from acetic acid.

In the Bulletin de la Société chimique de France, Vol. XXXI (1922) pages 113–118 experiments are described wherein acetic acid vapour is led through platinum tubes heated to about 1150° C. In these experiments, on rapid passage of the vapour, small quantities (less than 1%) of acetic anhydride were obtained, the major part of the liquid condensed from the reaction vapours consisting of unchanged acetic acid.

I have now found that acetic anhydride may readily be prepared by passing acetic acid vapour over or otherwise in contact with certain heated substances which are hereinafter in both the description and the claims for the sake of brevity referred to as "water binding agents". Such "water binding agents" comprise bisuphates, pyrosulphates, especially bisulphates or pyrosulphates of the alkali or earth alkali metals, zinc chloride, calcium chloride, and like substances which have a high affinity for water but no substantial deleterious effect on the acetic acid or acetic anhydride; said "water binding agents" may or may not have a "catalytic" effect in the reaction.

The reaction may be performed at temperatures of from about 200°–300° to 700° C. or higher, e. g. up to 1000° C., according to the "water binding agents" used. The higher the temperature the higher should be the speed of passage of the vapours, but, apart from this, certain substances may require higher temperatures than others, or certain substances may require or allow the employment of lower temperatures.

It will be understood that in the case of substances such as pyrosulphates, which are liable to be decomposed with formation of sulphuric anhydride at high heat, temperatures should not be employed at which such decomposition occurs.

In performing the invention I may pass the acetic acid vapour over one or more "water binding agents" heated to the desired temperature, the "water binding agents" being employed as such, or less advantageously spread upon, deposited on or mixed with porous materials such for example as pumice or Kieselguhr. Preferably I pass the acetic acid vapour in a stream through or over the "water binding agent" the latter being employed in solid or molten condition and subjected, if desired, to stirring or other agitation. The "water binding agent" may, if desired, be regenerated at desired intervals, or continuously with the reaction. For example (especially when employed in the molten state), it may be caused to circulate continuously from the reaction zone through a regeneration apparatus and then returned to the reaction zone. The regeneration may be effected by heating the "water binding agent" to move the water bound or absorbed thereby.

If desired the reaction gases may be subjected to fractional condensation to separate the anhydride from water vapour if same is present in the reaction gases, or to recover the acetic anhydride in as pure a form as possible; for example the hot reaction gases may be led up through one or more "fractionating" columns or apparatus whereby the acetic anhydride may be separated from the water vapour and, it may be, to any desired degree from any unconverted acetic acid.

Reference is had to the accompanying drawing, wherein

The figure is a diagrammatic showing of apparatus that may be employed in carrying out this process.

Referring to the drawing the reaction zone 1 contains a water binding agent, which in this form is in the molten state, and heated to the desired temperature, while 2 is the zone for the regeneration of the water binding agent. Acetic acid vapor is introduced by way of the pipe 3 into the molten and heated water binding agent 4 in the reaction zone 1. The vapors resulting from the reaction pass by way of the pipe 5 to the fractionating column 6, wherein the acetic anhydride is condensed and run off by the pipe 7, while the water vapor escapes by the pipe 8. The molten water binding agent is caused to pass continuously from the reaction zone 1 through the pipe 10 to the regeneration zone 2, wherein it is heated to drive off water absorbed in the reaction, and is caused to run from the regeneration zone 2 by the pipe 11 to the reaction zone 1.

In performing the process of the present invention the system may, if desired, be maintained under reduced pressure or "vacuum" whether or not the reaction gases are subjected to fractional condensation.

The acetic anhydride may be recovered from the crude reaction product in any suitable way, as for example by fractional distillation, preferably under vacuum, and if desired the crude reaction product may be distilled from dry sodium acetate.

The following is an example illustrating how the inventon may be performed, it being understood that this is merely illustrative and can be varied widely without departing from the invention.

*Example*

Acetic acid vapour generated by heating glacial acetic acid is passed in a stream at ordinary pressure or reduced pressure over sodium pyrosulphate heated to between about 300° C. and about 600° C., and the acetic anhydride produced is separated from the hot reaction gases or vapours by leading the hot reaction gases from the reaction chamber upwards through one or more fractionating columns. If desired, the sodium pyrosulphate may be regenerated continuously with the reaction, for example by causing it to circulate continuously from the reaction zone through a regeneration apparatus wherein it is heated to drive off the bound or absorbed water and thence back to the reaction zone.

What I claim and desire to secure by Letters Patent is:—

1. Process for the manufacture of acetic anhydride comprising passing acetic acid vapour in contact with at least one heated water binding agent.

2. Process according to claim 1, and wherein the reaction is performed at temperatures of from about 300° to 700° C.

3. Process for the manufacture of acetic anhydride, comprising passing acetic acid vapor in contact with at least one water-binding agent in a molten state.

4. Process for the manufacture of acetic anhydride, comprising passing acetic acid vapor in contact with at least one water-binding agent in a molten state, and agitating the molten water-binding agent during the passage of the acetic acid vapor therethrough.

5. Process for the manufacture of acetic anhydride, comprising passing acetic acid vapor in contact with at least one heated water-binding agent and subjecting the reaction vapor in contact with at least one water-binding the acetic anhydride.

6. Process for the manufacture of acetic anhydride, comprising passing acetic acid vapors to fractional condensation to separate ing agent maintained at temperatures from about 300° to 700° C. and subjecting the reaction vapors to fractional condensation to separate the acetic anhydride.

7. Process for the manufacture of acetic anhydride, comprising passing acetic acid vapor in contact with at least one heated water-binding agent and regenerating the water-binding agent continuously with the reaction.

8. Process for the manufacture of acetic anhydride, comprising passing acetic acid vapor in contact with at least one heated water-binding agent, regenerating the water-binding agent continuously with the reaction and subjecting the reaction vapors to fractional condensation to separate the acetic anhydride.

9. Process for the manufacture of acetic anhydride, comprising passing acetic acid vapor in contact with heated sodium pyrosulphate.

10. Process for the manufacture of acetic anhydride, comprising passing acetic acid vapor in contact with sodium pyrosulphate maintained at 300° to 600° C.

11. Process for the manufacture of acetic anhydride comprising passing acetic acid vapor in contact with sodium pyrosulphate maintained at 300° to 600° C. and subjecting the reaction vapors to fractional condensation to separate the acetic anhydride.

12. Process for the manufacture of acetic anhydride, comprising passing acetic acid vapor in contact with a heated alkali-metal pyrosulphate.

In testimony whereof I have hereunto subscribed my name.

HENRY DREYFUS.